United States Patent
Tüllmann

(10) Patent No.: US 9,061,386 B2
(45) Date of Patent: Jun. 23, 2015

(54) MACHINE TOOL

(75) Inventor: Udo Tüllmann, Eisenach (DE)

(73) Assignee: DECKEL MAHO SEEBACH GMBH, Seebach (DE)

( * ) Notice: Subject to any disclaimer, the term of this patent is extended or adjusted under 35 U.S.C. 154(b) by 735 days.

(21) Appl. No.: 13/394,540

(22) PCT Filed: Sep. 14, 2010

(86) PCT No.: PCT/EP2010/005643
§ 371 (c)(1),
(2), (4) Date: Apr. 4, 2012

(87) PCT Pub. No.: WO2011/032682
PCT Pub. Date: Mar. 24, 2011

(65) Prior Publication Data
US 2012/0213606 A1     Aug. 23, 2012

(30) Foreign Application Priority Data

Sep. 15, 2009   (DE) .................. 10 2009 041 596

(51) Int. Cl.
| B23Q 11/00 | (2006.01) |
| B23Q 1/01 | (2006.01) |
| B23Q 37/00 | (2006.01) |
| B23Q 39/02 | (2006.01) |
| B23C 1/06 | (2006.01) |
| B23B 11/00 | (2006.01) |
| B23P 23/02 | (2006.01) |
| B23B 3/06 | (2006.01) |

(52) U.S. Cl.
CPC ....... *B23Q 1/015* (2013.01); *Y10T 409/309576* (2015.01); *Y10T 409/309016* (2015.01); *Y10T 409/304088* (2015.01); *Y10T 29/5114* (2015.01); *B23B 2270/30* (2013.01); *Y10S 82/901* (2013.01); *Y10T 29/5112* (2015.01);

(Continued)

(58) Field of Classification Search
CPC .......... Y10T 409/304088; Y10T 409/307728; Y10T 409/308288; Y10T 409/309576; Y10T 82/2566; Y10T 29/5112; Y10T 29/5109; Y10T 29/5114; Y10T 408/50; Y10S 82/901; B23Q 11/0067
USPC ............ 409/137, 202, 212, 235; 82/149, 901; 29/27 A, 27 R, 27 C; 408/67
See application file for complete search history.

(56) References Cited

U.S. PATENT DOCUMENTS 1,332,978 A * 3/1920 Farmer ............................. 82/117
2,094,816 A * 10/1937 Poppensieker ................. 82/149
(Continued)

FOREIGN PATENT DOCUMENTS

| DE | 2224761 A1 * 11/1973 |
| JP | 61-103754 A * 5/1986 |
| WO | 9005048 A1   5/1990 |

OTHER PUBLICATIONS

Machine Translation of DE 2224761, which DE '761 was published Nov. 1973.*

*Primary Examiner* — Erica E Cadugan
(74) *Attorney, Agent, or Firm* — The Maxham Firm

(57) ABSTRACT

A machine tool for machining workpieces, comprising a dimensionally rigid machine base, a traveling stand that can be moved on the machine base, a machining unit that is mounted movably on the traveling stand and has at least one cutting tool and a supporting structure provided on the front longitudinal side of the machine base for fastening at least one workpiece. The supporting structure has a dimensionally stable frame, the longitudinal members of which arranged at a transverse distance delimit a clear space for the chip clearance, and wherein different workpiece carriers can be mounted at or on the frame.

11 Claims, 4 Drawing Sheets

(52) U.S. Cl.
CPC .......... *B23Q11/0067* (2013.01); *B23Q 39/029* (2013.01); *Y10T 82/2566* (2015.01); *Y10T 408/50* (2015.01); *B23B 3/065* (2013.01); *B23C 1/06* (2013.01); *B23Q 37/002* (2013.01); *B23Q 11/0053* (2013.01)

(56) References Cited

U.S. PATENT DOCUMENTS

| | | | |
|---|---|---|---|
| 3,867,054 A | 2/1975 | Muller | |
| 5,052,089 A * | 10/1991 | Gadaud et al. | 29/27 R |
| 5,117,552 A | 6/1992 | Babel | |
| 5,611,137 A * | 3/1997 | Braun | 409/137 |
| 6,547,498 B1 | 4/2003 | Sugata et al. | |
| 6,641,341 B2 * | 11/2003 | Sato et al. | 409/137 |
| 6,682,278 B2 | 1/2004 | Gronbach et al. | |
| 7,237,310 B2 | 7/2007 | Sasazawa et al. | |
| 7,240,411 B2 | 7/2007 | Matsumoto et al. | |
| 7,240,412 B2 | 7/2007 | Sasazawa et al. | |
| 8,714,535 B2 * | 5/2014 | Jung et al. | 269/57 |
| 2004/0102297 A1 * | 5/2004 | Quak et al. | 483/56 |
| 2010/0173762 A1 | 7/2010 | Tullmann et al. | |
| 2014/0308087 A1 * | 10/2014 | Tullmann et al. | 409/134 |

* cited by examiner

COLLECTOR FOR CHIPS AND
OTHER WORKING MATERIALS
DISPOSED UNDER THE
SUPPORTING FRAME

*FIG. 4* ions relate to a machine tool for
MACHINE TOOL

FIELD OF INVENTION

The invention embodiments relate to a machine tool for machining workpieces, comprising a dimensionally rigid machine base, a traveling stand that can be horizontally moved on the machine base, a machining unit that is mounted movably on the traveling stand and has at least one exchangeable cutting tool and a supporting structure provided on the front longitudinal side of the machine base for receiving and fastening at least one workpiece.

BACKGROUND OF THE INVENTION

For the machining of workpieces of large longitudinal dimensions machine tools are used which have machine stands which can be moved by a motor as so-called traveling stands on a machine base which, as a rule, is flat and elongated. As a drive unit for the traveling movements of the traveling stand, mostly electric linear motors have been used lately which, in contrast to conventional electromechanical or fluidic drive systems, have advantages regarding acceleration, accuracy, costs, and the like. In such machining tools, a supporting structure is provided on the front longitudinal side of the machine base, on which can be clamped one or more of the workpieces of large longitudinal dimensions to be machined. These supporting structures are designed like bases and formed to receive workpiece tables that are stationary or can be longitudinally displaced. A considerable disadvantage of such systems is the fact that the chips accumulate in heaps on the planar surfaces of the supporting structure and the workpiece tables, respectively, and cannot be removed automatically. In addition, these known supporting structures are limited in their possibilities of variation for receiving different workpieces.

SUMMARY OF EMBODIMENTS OF THE INVENTION

It is a purpose of embodiments of the invention to provide a machine tool for machining workpieces which is adapted for workpieces of substantial volumes with large chippings and yields a particularly advantage chip clearance as well as favorable possibilities of using the work space.

As described herein, this purpose is achieved by the fact that the supporting structure has a dimensionally rigid frame, the longitudinal members of which are supported on an at least partially open base, and that different workpiece carriers can be mounted at or on the frame.

By forming the supporting structure as a dimensionally rigid frame including longitudinal members spaced apart from each other a free clear space is created between the two longitudinal members through which chips and liquids that occur during machining can drop and be collected in a suitable collector. Apart therefrom, the longitudinal members are disposed and formed such that different workpiece carrying means, such as fixed or movable workpiece tables, or both, workpiece rotary tables, interchangeable pallets, and vertical clamping systems, among others, can be disposed on or at these longitudinal members.

The longitudinal members of the supporting frame may rest on continuous or intermittent bars that are directly supported on the bottom foundation. Besides, there is the suitable possibility that the supporting frame is supported on transverse supports spaced apart from each other in the longitudinal direction of the frame, which transverse supports are disposed on a continuous substructure provided on the front longitudinal side of the machine base and has an inclined upper sliding surface for chips or the like. Together with the corresponding portions of the longitudinal members, the transverse supports spaced apart from each other delimit free spaces through which the chips and other working materials may drop. The oblique surface of the substructure, which also extends between the transverse supports, enables an extensive automatic removal of the chips by gravity.

Suitably, the longitudinal members have a profile that allows the simple mounting of guiding rails for movable workpiece carriers as well as of clamping devices for fixing stationary workpiece carriers.

A particularly high dimensional rigidity of the overall machine tool can be achieved by the fact that the substructure for the supporting frame and the supporting structure, respectively, are integrally formed in one piece with the low base of the traveling stand machine. Apart from that, however, the so-called duo-block constructional style may also be used in which the base-like substructure of the supporting structure and the machine base are each produced as separate building units and fastened to each other by suitable means.

According to an advantageous embodiment of the invention, at least one workpiece table may be mounted as a workpiece holder on the two longitudinal members of the supporting frame so as to be fixed or movable, which enables largely continuous machining of a plurality of clamped-on workpieces.

According to another suitable embodiment of the invention, at least one clamping device can be mounted as a workpiece holder for clamping and rotating a workpiece on the two longitudinal members of the supporting frame so as to be stationary or movable. In this clamping device workpieces can be clamped horizontally, the use of two spaced-apart clamping devices enabling the clamping of a workpiece at both ends thereof. The clamping device may also be a rotationally driven rotary table including a vertical clamp-on plate. Suitably, the clamping devices should be movable by means of an appropriate drive unit, for example, in the form of a spindle drive on guiding rails that are mounted on the longitudinal members.

Another suitable embodiment of the invention is characterized in that a collector for chips and other working materials is disposed under the supporting frame of the supporting structure.

BRIEF DESCRIPTION OF THE DRAWING

The objects, advantages, features, and other desirable characteristics of embodiments of the invention can be readily perceived from the following detailed description and attached drawing, in which:

FIG. 4 schematically shows a collector for chips and other working materials.

DETAILED DESCRIPTION OF EMBODIMENTS OF THE INVENTION

Figure 1:
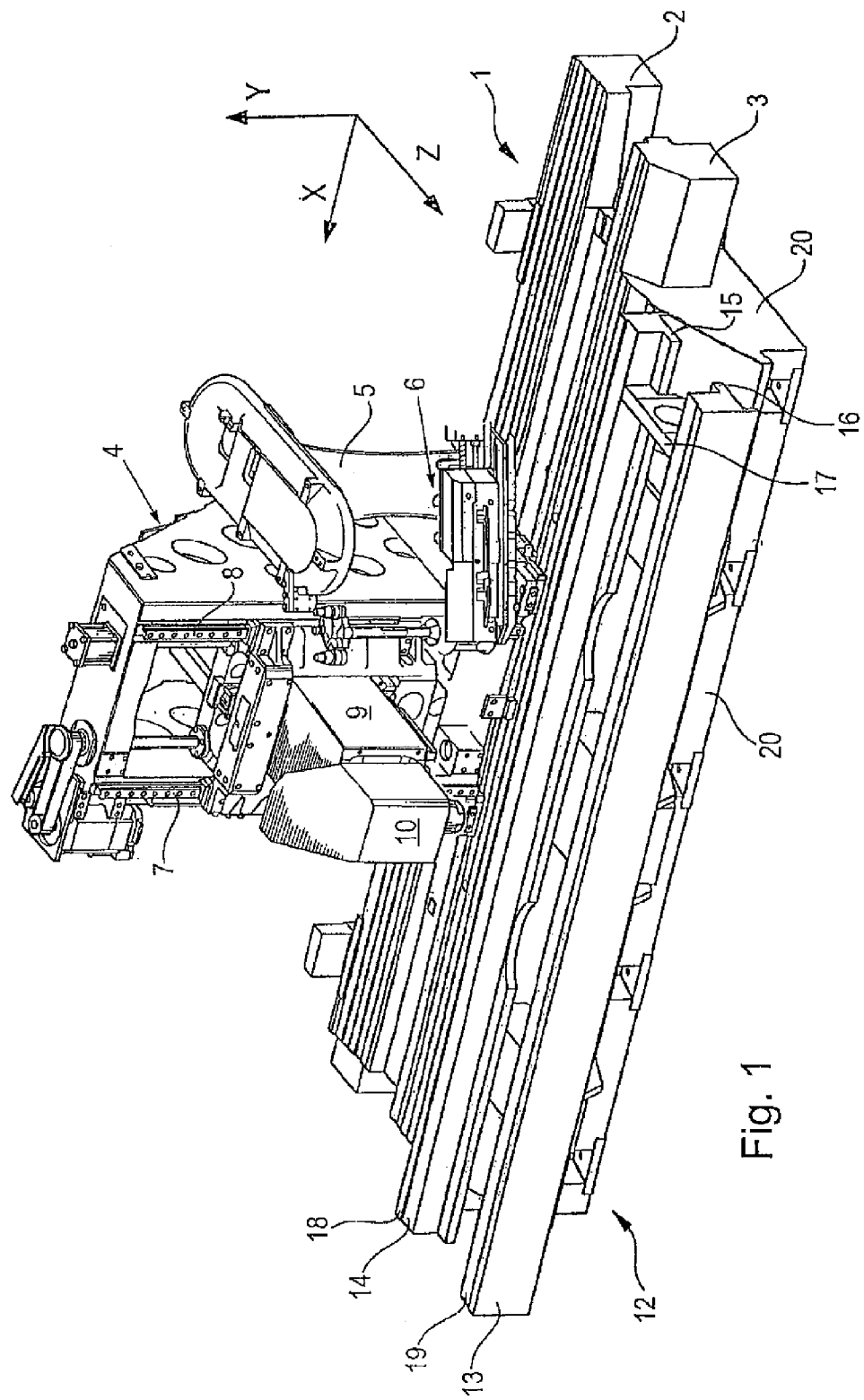
FIG. 1 is a perspective view of an embodiment of the inventive machine tool.

The machine tool shown in its entirety in FIG. 1 comprises a flat machine base 1 longitudinally extending in the X direction, the machine base having two longitudinal bars 2, 3 parallel to one another with upper side guides. On the longitudinal bars of the flat machine base is traveling stand 4 which can be displaced by a motor (not shown) in the direction of the X axis. Tool magazine 5, including tool changer 6 formed as a horizontal chain magazine, is associated on the traveling stand. On the front of traveling stand 4 machining unit 9 is guided in guiding rails 7, 8 so as to be vertically displaceable in the Y direction, which machining unit has milling head 10 with a vertically oriented work spindle on the front thereof.

On the front face in the Z direction of machine base 1 is disposed supporting structure 12 formed according to an embodiment of the invention and which will be explained in more detail below. This support structure has two longitudinal members 13, 14 that extend in the X coordinate direction at a predetermined transverse distance and thus delimit a central elongated free space on both sides. Both longitudinal members 13, 14 have a cross-sectional profile with a respective inner side horizontal longitudinal link 15, 16, which serve as rests and guiding rails on both sides, for example, for transverse pieces 17. Both longitudinal members 13, 14 have vertical outer surfaces and their top surfaces 18, 19 extend in the same horizontal plane in the embodiment as depicted.

Figure 2:
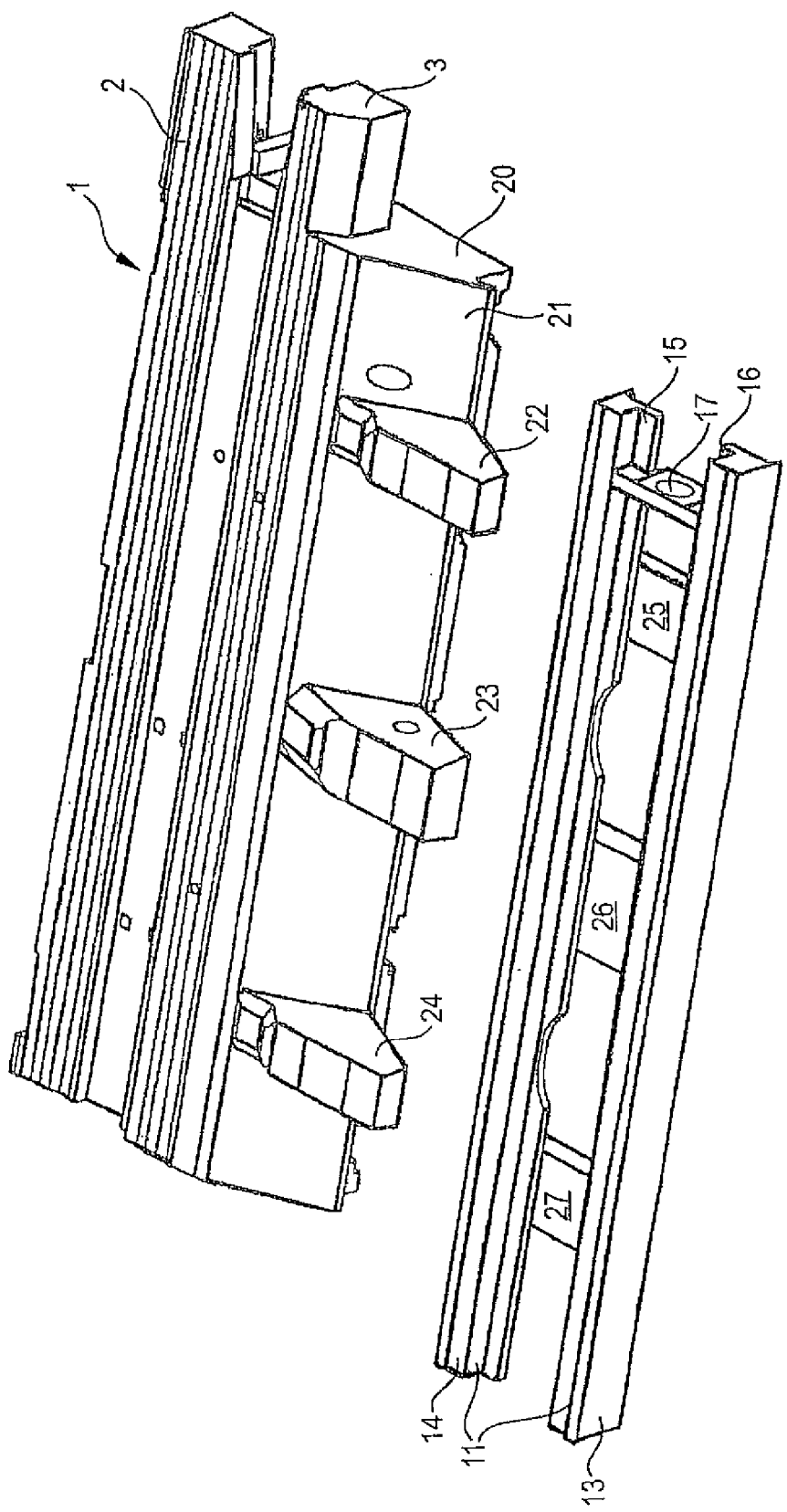
FIG. 2 is a perspective view of the lower part of the machine tool of FIG. 1 including the machine base and the supporting structure.

With particular reference to FIG. 2, dimensionally rigid substructure 20 is also provided on the front longitudinal side of base 1, which substructure is integrally formed with the two longitudinal bars 2, 3 of the base, or may also be firmly attached to the two longitudinal bars as a separate building unit. This substructure has on its front an inclined surface 21 extending across the entire length thereof which serves as a sliding surface for solids and liquids produced in machining operations. A plurality (three in this case) of transverse supports 22, 23, 24 are furthermore disposed on the inclined front of substructure 20, which have top surface portions extending in a horizontal plane. Front longitudinal member 13 is supported on the front top surface portions of transverse pieces 22 to 24, and the rear longitudinal member 14 rests on the rear (machine side) portions of transverse pieces 22 to 24. Longitudinal members 13, 14 are kept at a distance from each other by bearing plates 25, 26, 27 which rest on the central portions of transverse pieces 22 to 24 in the embodiment depicted in FIG. 2. With their rear surfaces the transverse pieces 22, 23, 24 are supported on inclined surface 21, the inclination of which is selected such that produced chips cannot adhere to it but slide downward.

Figure 3:
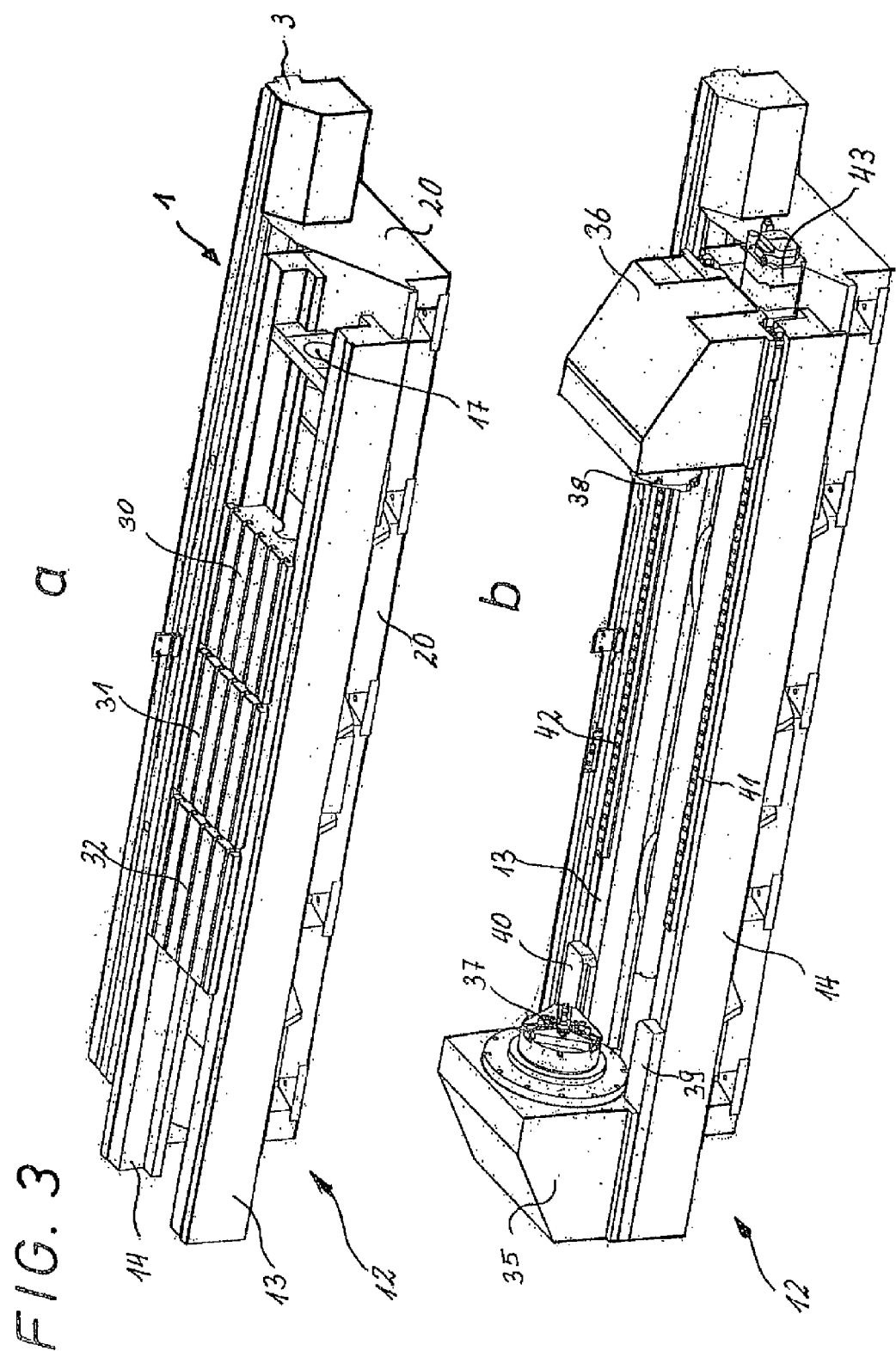
FIG. 3 shows perspective views of the supporting structure according to embodiments of the invention, including a plurality of workpiece tables in FIG. 3*a* and two clamping devices in FIG. 3*b*.

The frame construction shown in FIG. 3*a* corresponds in its technical concept to the embodiment of FIGS. 1 and 2 so that the details described therein will not be explained more closely in order to avoid repetitions. The same components are designated by the same reference numerals.

FIGS. 1 and 2 show the supporting structure formed according to the invention without a workpiece carrier. In the embodiment of FIG. 3*a* three workpiece tables 30, 31, 32 are sequentially disposed between the two longitudinal members 13, 14 of supporting structure 12 which can be displaced by means (not shown) in the longitudinal direction or are fixedly locked in these positions. Workpieces may be clamped onto the clamping plates of these workpiece tables in the usual manner which need not be detailed here.

In the embodiment of FIG. 3*b* the above-described technical concept of using two longitudinal members 13, 14 in parallel to one another is employed, as shown in FIGS. 1 and 2. Two clamping devices 35, 36, which each have clamping means 37, 38 for fixing an elongated workpiece on the fronts facing one another, are disposed on the supporting frame formed by longitudinal members 13, 14 of supporting structure 12 shown in FIG. 3*b*. In this embodiment left clamping device 35 is firmly mounted on supporting rails 39, 40 on the upper surfaces of the longitudinal members. The right clamping device 36 can be moved on two guiding rails 41, 42 in the longitudinal direction so that the distance between clamping devices 35 and 36 may be adjusted. A drive aggregate 43 is kinematically coupled to clamping device 36.

Apart from the workpiece carriers as shown, comprising workpiece tables 30 to 32 and clamping devices 35, 36, further suitable workpiece carriers, for example, rotationally driven rotary tables, may be used instead of workpiece tables 30 to 32. In any case, supporting frame 12 includes longitudinal members 13, 14 which ensures sufficiently high rigidity even if the different workpiece carriers are used and that the chips and the other working materials may drop into the clear space between the two longitudinal members without any detrimental formation of accumulations.

The invention claimed is:

1. A machine tool for machining workpieces, comprising:
a dimensionally rigid machine base having a horizontal longitudinal axis which extends in the direction of an X coordinate axis, the machine base also having a transverse horizontal axis extending in the direction of a Z coordinate axis transversely with respect to the longitudinal axis;
a traveling stand movably mounted on said machine base;
a machining unit that is mounted movably on said traveling stand and has at least one cutting tool, wherein the Z coordinate axis extends from a front of the machine base proximate to the machining unit to a rear of the machine base distal from the machining unit; and
a supporting structure for supporting at least one workpiece, the supporting structure being provided on a front longitudinal side of said machine base, said supporting structure having a dimensionally stable supporting frame comprising longitudinal members, each having a longitudinal axis extending parallel to the X coordinate axis, the longitudinal members being spaced from one another in the direction of the Z coordinate axis to delimit a clear space therebetween for chip clearance, said supporting frame being formed for receiving and mounting different workpiece holders;
wherein the front longitudinal side includes an inclined upper sliding surface, inclined with respect to horizontal and vertical planes, for chips and other working materials;
wherein a plurality of transverse supports that each extend in the direction of the Z coordinate axis and that are spaced from one another in the direction of the X coordinate axis are provided on the inclined surface; and
wherein the supporting structure is supported on the transverse supports.

2. The machine tool according to claim 1, wherein said supporting frame is supported on upper surfaces of the transverse supports.

3. The machine tool according to claim 1, wherein said rigid machine base comprises a continuous substructure on which said transverse supports are disposed, said continuous substructure having said inclined upper sliding surface for chips and other working materials.

4. The machine tool according to claim 3, wherein said substructure supports said supporting frame, said substructure being rigidly attached to said machine base or integrally formed therewith.

5. The machine tool according to claim 1, wherein said longitudinal members are configured for fastening and supporting different kinds of the workpiece holders.

6. The machine tool according to claim 5, wherein said workpiece holders comprise at least one workpiece table which is mounted on said longitudinal members of said supporting frame so as to be fixed or movable.

7. The machine tool according to claim 5, wherein said workpiece holders comprise at least one clamping device for clamping and rotating a workpiece, said at least one clamping device being mounted on said longitudinal members of said supporting frame so as to be stationary or movable.

8. The machine tool according to claim 7, wherein said at least one clamping device is mounted on said longitudinal members of said supporting frame so as to be movable on guiding rails, which guiding rails are on said longitudinal members, and the machine tool further comprising a drive unit allocated to said at least one clamping device so as to move said at least one clamping device on said guiding rails.

9. The machine tool according to claim 5, wherein said workpiece holders comprise at least one clamping device having a rotationally driven vertical rotary table mounted on said longitudinal members of said supporting frame so as to be movable or stationary.

10. The machine tool according to claim 9, wherein said at least one clamping device is mounted on said longitudinal members of said supporting frame so as to be movable on guiding rails, which guiding rails are on said longitudinal members, and the machine tool further comprising a drive unit allocated to said at least one clamping device so as to move said at least one clamping device on said guiding rails.

11. The machine tool according to claim 1, and further comprising a collector for chips and other working materials disposed under said supporting frame.

* * * * *